(12) United States Patent
Yamamoto

(10) Patent No.: US 6,185,955 B1
(45) Date of Patent: Feb. 13, 2001

(54) REFRIGERATING SYSTEM WHICH CAN FAVORABLY USE AS A REFRIGERANT, A FLUID SMALLER IN SPECIFIC VOLUME THAN A GENERAL REFRIGERANT

(75) Inventor: Kiyokazu Yamamoto, Isesaki (JP)

(73) Assignee: Sanden Corp. (JP)

( * ) Notice: Under 35 U.S.C. 154(b), the term of this patent shall be extended for 0 days.

(21) Appl. No.: 09/358,855

(22) Filed: Jul. 22, 1999

(30) Foreign Application Priority Data

Aug. 5, 1998 (JP) .................................................. 10-221633

(51) Int. Cl.[7] ....................................................... F25B 43/02
(52) U.S. Cl. ................................................. 62/470; 62/475
(58) Field of Search ............................... 62/475, 470, 114

(56) References Cited

U.S. PATENT DOCUMENTS 5,001,908 * 3/1991 Mayer ..................................... 62/470
5,245,836 9/1993 Lorentzen et al. ..................... 62/174
5,927,101 * 12/1999 Oh .......................................... 62/468
6,000,233 * 12/1999 Nishida et al. ........................ 62/114

* cited by examiner

Primary Examiner—William Doerrler
Assistant Examiner—Melvin Jones
(74) Attorney, Agent, or Firm—Banner & Witcoff, Ltd.

(57) ABSTRACT

In a refrigerating system using a given refrigerant, a compressor (1) contains lubricating oil and compresses the given refrigerant into a supercritical state having pressure higher than the critical pressure of the given refrigerant. In this event, the compressor discharges a compressed refrigerant of the supercritical state together with the lubricating oil. The compressed refrigerant is separated from the lubricating oil by an oil separator (2) and thereafter cooled in a radiator (3) into a cooled refrigerant. After being decompressed in an expander (4) and evaporated in an evaporator (5), the cooled refrigerant is supplied as the given refrigerant to the compressor.

10 Claims, 2 Drawing Sheets

US 6,185,955 B1

REFRIGERATING SYSTEM WHICH CAN FAVORABLY USE AS A REFRIGERANT, A FLUID SMALLER IN SPECIFIC VOLUME THAN A GENERAL REFRIGERANT

BACKGROUND OF THE INVENTION

The present invention relates to a refrigerating system in which a fluid other than fluorocarbon can be used as a refrigerant.

In recent decades, it is reported that emissions of various chemicals including fluorocarbon (particularly, chlorofluorocarbon often abbreviated to CFC) will deplete a protective ozone layer surrounding the earth. As one of approaches to reduce such hazardous emissions, development is made of a refrigerating system using a substitute refrigerant instead of a fluorocarbon refrigerant.

For example, U.S. Pat. No. 5,245,836 discloses a refrigerating system using carbon dioxide as a refrigerant. In this refrigerating system, carbon dioxide is supplied to a compressor to be compressed into a supercritical state having a pressure higher than its critical pressure. Then, carbon dioxide in the supercritical state is cooled by a radiator, decompressed or reduced in pressure by an expander, and evaporated by an evaporator. During evaporation, heat is absorbed from an external fluid such as air as latent heat of evaporation. Thus, desired refrigeration is carried out.

The "suporcritical state" mentioned above is a state in which each of the temperature and the pressure of carbon dioxide is equal to or higher than its critical point, in other words, a state in which carbon dioxide molecules are moving around like in a gaseous phase although the density of carbon dioxide is substantially equal to a liquid-phase density. As will be understood from the Mollier diagram, the critical temperature of carbon dioxide is about 31° C. and the critical pressure corresponding thereto is about 7.38 MPa (mega pascal).

As described above, the critical temperature of carbon dioxide is about 31° C. which is considerably low as compared with a halogenated refrigerant (for example, 112° C. for R12 (=$CCl_2F_2$)). Therefore, in a high-temperature environment such as in a summer season, the temperature of the outside air may become higher than the temperature of carbon dioxide as the refrigerant so that the temperature of carbon dioxide at an outlet of the radiator is higher than 31° C. In such a situation, the radiation of carbon dioxide at the radiator is decreased and, as a result, the heat exchange at the evaporator is decreased. Thus, it is difficult to achieve a desired refrigerating effect. In view of the above, in a refrigerating circuit using carbon dioxide as a refrigerant, an outlet pressure of the radiator is set at a high level to remove the above-mentioned disadvantage. Such a high outlet pressure of the radiator can be obtained by increasing a discharge pressure of the compressor.

In the meanwhile, the amount G of the refrigerant circulating through the refrigerating circuit (hereinafter referred to as the circulating amount) is given by:

$$G = (q\eta)/v,$$

where q represents a displacement by a piston of the compressor, $\eta$, a volumetric efficiency, and v, a specific volume of the confined refrigerant. Therefore, as far as the compressor is not exchanged, the circulating amount G is inversely proportional to the specific volume of the confined refrigerant. It is noted here that the specific volume of carbon dioxide is smaller than that of the halogenated refrigerant. Accordingly, the circulating amount G of the refrigerating circuit using carbon dioxide as the confined refrigerant is great as compared with the case where the halogenated refrigerant is used. For example, the circulating amount G for carbon dioxide is about 5.5 times and about 7 times as great as those for R12 and R134a (=$CH_2FCF_3$), respectively. This means that, in the refrigerating circuit using carbon dioxide as the confined refrigerant, the refrigerating ability equivalent to that achieved by the halogenated refrigerant can be assured even when the circulating amount G is about 1/5.5 and about 1/7 as small as those for R12 and R134, respectively. The circulating amount G of such a small value decreases a pressure loss in a refrigerant pipeline. Therefore, the refrigerant pipeline is allowed to have a small inner diameter as compared with that of the refrigerating circuit using the halogenated refrigerant. For example, the inner diameter of the refrigerant pipeline can be reduced to about 1/4 as compared with the case where R134a is used.

As described above, the inner diameter of the refrigerant pipeline will be reduced by the use of carbon dioxide as the refrigerant. However, it is still necessary to provide an arrangement for avoiding the wear and the damage of various parts of the compressor, i.e., sliding surfaces of a piston and a piston cylinder and sliding portions of bearings. For this purpose, a lubricating oil is confined in the refrigerating circuit in addition to carbon dioxide as the refrigerant. The lubricating oil circulates through the refrigerating circuit to lubricate the sliding surfaces and the sliding portions.

In case where the refrigerant pipeline has a small inner diameter, sticking of the lubricating oil onto an inner surface of the refrigerant pipeline will result in a considerable increase in pressure loss. Under the circumstances, the inner diameter of the refrigerant pipeline is inevitably increased even if carbon dioxide is used as the refrigerant. Thus, it is difficult to achieve an advantage which would be obtained by the use of carbon dioxide as the refrigerant, i.e., to achieve reduction in size of the refrigerating system.

SUMMARY OF THE INVENTION

It is therefore an object of the present invention to provide a refrigerating system which can favorably use a given refrigerant smaller in specific volume than a halogenated refrigerant.

It is another object of the present invention to provide a refrigerating system of the type described, which can be reduced in size by the use of the given refrigerant without causing a drawback following the reduction in size.

Other objects of the present invention will become clear as the description proceeds.

According to this invention, there is provided a refrigerating system which uses a given refrigerant and comprises a compressor for compressing the given refrigerant into a supercritical state having pressure higher than critical pressure of the given refrigerant. The compressor contains lubricating oil which is dissolved in the given refrigerant, and will discharge a compressed refrigerant of the superaritical state and the lubricating oil. The refrigerating system further comprises an oil separator connected to the compressor and supplied with the compressed refrigerant for separating the lubricating oil from the compressed refrigerant to produce an oil-separated refrigerant, a radiator connected to the oil separator for cooling the oil-separated refrigerant into a cooled refrigerant, expanding means connected to the radiator for decompressing the cooled refrigerant into a decompressed refrigerant having pressure lower than the critical pressure, and an evaporator connected to the expanding means and the compressor for evaporating the decompressed refrigerant into an evaporated refrigerant which is supplied as the given refrigerant to the compressor.

DESCRIPTION OF THE PREFERRED EMBODIMENTS

Figure 1:
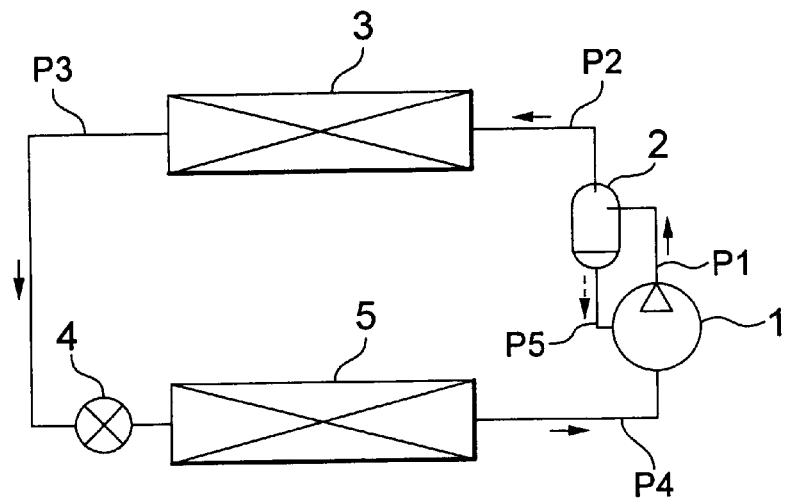
FIG. 1 is a circuit diagram of a refrigerating system according to a first embodiment of the present invention.
Figure 2:
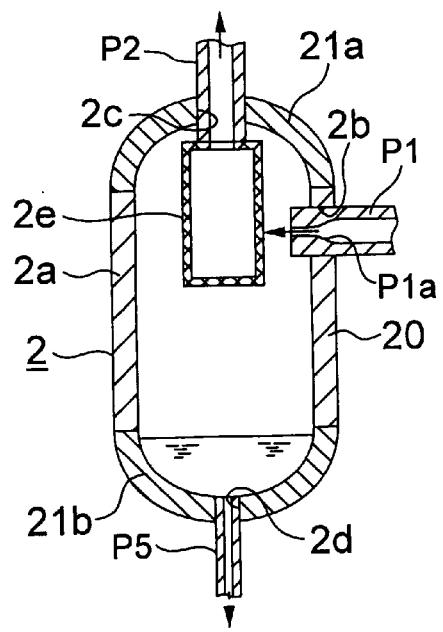
FIG. 2 is a vertical sectional view of an oil separator included in the refrigerating system of FIG. 1.

Referring to FIGS. 1 and 2, description will be made about a refrigerating system according to a first embodiment of the present invention.

The refrigerating system uses carbon dioxide as a given refrigerant and comprises a refrigerating circuit comprising a compressor 1, an oil separator 2, a radiator 3, an expander 4, and an evaporator 5 which are connected in series by a discharge pipe P1, connecting pipes P2 and P3, and a suction pipe P4. The compressor 1 is for compressing the given refrigerant to be a supercritical state having pressure higher than critical pressure of the given refrigerant. In the manner known in the art, the compressor 1 contains lubricating oil dissolved in the refrigerant, and will discharge a compressed refrigerant of the superaritical state and the lubricating oil. The oil separator 2 is connected to the compressor 1 for separating the lubricating oil from the compressed refrigerant of the supercritical state to produce an oil-separated refrigerant. The radiator 3 is connected to the oil separator 2 for cooling the oil-separated refrigerant into a cooled refrigerant. The expander 4 is connected to the radiator 3 and is for decompressing the cooled refrigerant into a decompressed refrigerant having pressure lower than the critical pressure of the given refrigerant. The evaporator 5 to connected to the expander 4 and the compressor 1, and is for evaporating the decompressed refrigerant into an evaporated refrigerant which is supplied as the given refrigerant to the compressor 1. The expander 4 is referred to as an expanding arrangement.

The refrigerating circuit further comprises an oil return or recycling pipe P5 connected between the oil separator 2 and the compressor 1. The oil return pipe P5 is for returning said lubricating oil from the oil separator 2 to the compressor 1.

In the refrigerating circuit, the carbon dioxide is confined in the refrigerating circuit instead of a halogenated refrigerant and, on a high-pressure side, is kept at a pressure exceeding its critical pressure. It is noted here that the critical temperature of carbon dioxide is about 31° C. and the critical pressure corresponding thereto is about 7.38 MPa (mega pascal).

In addition to carbon dioxide as the refrigerant, a lubricating oil is confined in the refrigerating circuit to avoid the wear and the damage of various parts of the compressor 1, i.e, sliding surfaces of a piston and a piston cylinder and sliding portions of bearings. The lubricating oil is selected from various materials which are free from transformation such as carbonization even if the pressure on the high-pressure side exceeds the critical pressure of carbon dioxide.

Referring to FIG. 2, the oil separator 2 comprises a tank 2a composed of a cylindrical portion 20 and a pair of upper and lower caps 21a and 21b closing upper and lower open ends of the cylindrical portion 20, respectively. Each of the caps 21a and 21b has a semispherical shape and is fixed to the cylindrical portion 20 by welding. With this structure, the tank 21 keeps a high durability against pressure. The cylindrical portion 20 of the tank 2a is provided with an inlet hole 2b formed at an upper portion of its side surface. The upper cap 21a is provided with an outlet hole 2a formed at its top. The lower cap 21b is provided with a return hole 2d formed at its top. Into the inlet hole 2b, one end of the pipe P1 is inserted and fixed to the cylindrical portion 20 by welding. Into the outlet hole 2a, one end of the pipe P2 is inserted and fixed to the upper cap 21a by welding. Into the return hole 2d, one end of the oil return pipe P5 is inserted and fixed to the lower cap 21b by welding. The other end of the pipe P1 is connected to an outlet portion of the compressor 1. The other end of the pipe P2 is connected to an inlet portion of the radiator 3. The other end of the oil return pipe P5 is connected to a portion accommodating a driving mechanism of the compressor 1. Although not illustrated in the figure, the oil separator 2 and the oil return pipe P5 are covered with a heat insulating material so that the oil separator 2 and the oil return pipe 5 are not cooled down during operation of the refrigerating system.

Furthermore, the oil separator 2 is disposed in the vicinity of the outlet portion of the compressor 1 so that heat is readily transferred from the outlet portion of the compressor 1 to the oil separator 2. Specifically, the oil separator 2 is arranged at a position such that the ratio of the length of the pipe P1 to that of the pipe P2 is equal to 1:3.

The one end of the pipe P1 inserted into the inlet hole 2b of the oil separator 2 is provided with a throttle P1a formed on an inner surface thereof. The throttle P1a is formed by reducing the inner diameter of the one end of the pipe P1 towards the tank 2a. The one end of the pipe P2 inserted into the outlet hole 2c is connected to an oil separating member 2e protruding downward to a position faced to the inlet hole 2b. With this structure, carbon dioxide as the refrigerant inevitably passes through the oil separating member 2e when it flows from the oil separator 2 towards the radiator 3. As the oil separating member 2e, use is made of a cylindrical mesh material or a cylindrical porous material.

The description will hereafter be directed to the operation of the above-mentioned refrigerating system. At first, the compressor 1 is given a discharge pressure selected within a pressure range between 9.81 MPa and 16.67 MPa. Thus, the lower limit of the pressure range exceeds the critical pressure (about 7.38 MPa) of carbon dioxide. The discharge pressure is selected to be high as mentioned above for the purpose of increasing an outlet pressure of the radiator so as to remove the above-mentioned disadvantage caused when the temperature of the outside air is high.

After the discharge pressure of the compressor 1 is selected as mentioned above, carbon dioxide is discharged from the compressor 1 and flows through the pipe P1 into the tank 2a of the oil separator 2. At this time, carbon dioxide is decompressed by the throttle P1a formed at the one end of the pipe P1. The decrease in pressure is on the order of several MPa. However, such decompression by the throttle P1a is not so great to decrease the pressure of carbon dioxide flowing into the tank 2a to a level lower than the critical pressure (about 7.38 MPa). Carbon dioxide is dissolved into the lubricating oil when it flows into the tank 2a. By the above-mentioned decompression, separation of carbon dioxide from the lubricating oil in the oil separator 2 is promoted. By way of example, when the temperature in the tank 2a is 70° C., separation of carbon dioxide from the lubricating oil is further promoted by decreasing the pressure of carbon dioxide from 12 MPa to 8 MPa.

In the meanwhile, carbon dioxide dissolved in the lubricating oil and flowing into the tank, 2a is separated from the lubricating oil mainly during passage through the oil separating member 2e. After carbon dioxide is separated, the lubricating oil is collected at the bottom of the tank 2a. When the amount of the lubricating oil thus collected exceeds a predetermined value, a float valve (not shown) is opened to guide the lubricating oil from the return hole 2d through the oil return pipe P5 to the portion accommodating the driving mechanism of the compressor 1.

Carbon dioxide flowing from the oil separator 2 through the pipe P2 into the radiator 3 further flows through the radiator 3. At this time, heat exchange accompanying heat release from carbon dioxide is carried out through the radiator 3 between the outside air and carbon dioxide. As described above, the compressor 1 is given the discharge pressure selected to be high. Therefore, the outlet pressure of the radiator 3 is also selected to be high. Thus, it is possible to prevent the decrease in radiation at the radiator. As a result, a desired refrigerating effect can be obtained at the evaporator.

After flowing through the radiator 3, carbon dioxide Is supplied through the pipe P3 to the expander 4 and passes through the expander 4. During the passage, the pressure of carbon dioxide to decreased to a level lower than the critical pressure. Then, carbon dioxide passing through the expander 4 flows into the evaporator 5. As the expander 4, use may be made of various known apparatuses. In this embodiment, it is preferable to use a temperature-sensing expansion valve. By the use of the temperature-sensing expansion valve, the flow rate at the outlet portion of the evaporator 5 is controlled so as to keep a constant superheating degree thereat. Carbon dioxide flowing into the evaporator 5 further flows through the evaporator 5. At that time, heat exchange accompanying heat absorption into carbon dioxide is carried out through the evaporator 5 between the outside air and carbon dioxide so that carbon dioxide in the evaporator 5 is evaporated. As a result, the outside air is cooled.

After flowing through the evaporator 5, carbon dioxide flows through the suction pipe P4 into the inlet portion of the compressor 1. Carbon dioxide is compressed again by the compressor 1 to a pressure higher than the critical pressure and is discharged from the compressor 1 towards the radiator 3.

In the above-mentioned refrigerating system according to the first embodiment of the present invention, carbon dioxide smaller in specific volume than the halogenated refrigerant is used as the confined refrigerant of the refrigerating circuit. The discharge pressure of the compressor is selected to be equal to or higher than the critical pressure.

The oil separator is disposed between the compressor and the radiator to separate carbon dioxide and the lubricating oil. Therefore, it is possible to reduce the amount of the lubricating oil flowing downstream from the oil separator to a refrigerant pipeline leading to the radiator, the expander, the evaporator, and the compressor. It is therefore possible to suppress sticking of the lubricating oil onto an inner peripheral surface of the refrigerant pipeline at the above-mentioned part. Thus, it is possible to minimize the pressure loss caused by sticking of the lubricating oil onto the inner peripheral surface of the refrigerant pipeline. Accordingly, as compared with the case where the halogenated refrigerant is confined, the inner diameter of the refrigerant circuit of the refrigerating system can be reduced. As a consequence, it to possible to achieve an advantage obtained by the use of carbon dioxide as the refrigerant, i.e., the reduction in size of the refrigerating system.

In the first embodiment described above, the throttle P1a is formed at the one end of the pipe P1 inserted into the inlet hole 2b of the oil separator 2. However, this invention is not restricted thereto. For example, the throttle may be formed on an inner peripheral wall of the inlet hole 2b. In this event, the one end of the pipe P1 is located at a position coincident with the inlet hole 2b and then fixed to an outer side surface of the cylindrical portion 20 by welding. As will readily be understood, no throttle is required in case where the oil separator 2 performs sufficient oil separation without requiring the decompression effect or in case where the oil separator 2 performs sufficient oil separation because substantial decompression is carried out by adjusting the relationship between the inner diameter of the pipe P1 and the capacity of the tank 2a.

In the first embodiment described above, the oil separating member 2e is attached to the one end of the pipe P2 inserted into the outlet hole 2a of the oil separator 2. However, this invention is not restricted thereto. The oil separating member 2e can be disposed at any desired position as far as the lubricating oil flowing into the tank 2a is contacted thereto. For example, the oil separating member 2e may be attached to the one end of the pipe P1 inserted into the inlet hole 2b. As will readily be understood, no separating member 2e is required in case where the oil separator 2 performs sufficient oil separation with the decompression effect alone.

In the first embodiment described above, the oil separator 2 and the compressor 1 are formed as separate components. However, this invention is not restricted thereto. For example, the oil separator 2 or a functional component equivalent in function thereto may be integrally assembled with the compressor. With this structure, the refrigerating system can be further reduced in size.

Figure 3:
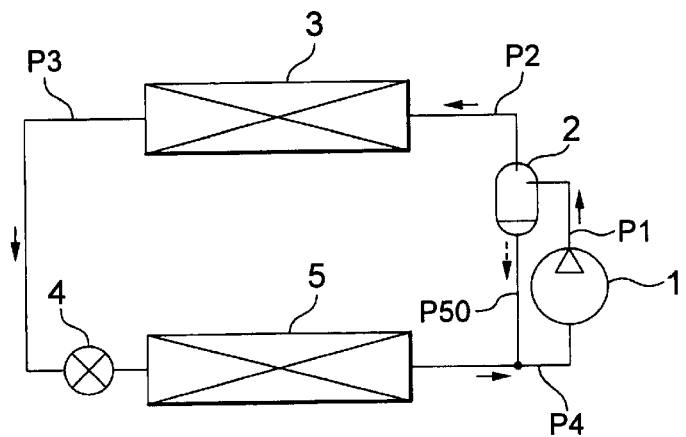
FIG. 3 is a circuit diagram of a refrigerating system according to a second embodiment of the present invention.

Referring to FIG. 3, the description will be made as regards a refrigerating system according to a second embodiment of the present invention. The refrigerating system is similar in structure to the refrigerating system of FIG. 1 except the oil return pipe P5 is replaced by an oil return pipe P50.

In the refrigerating system of FIG. 1, the lubricating oil collected in the tank 2a of the oil separator 2 is guided through the oil return pipe P5 into the compressor 1 as described in the foregoing. On the other hand, in the refrigerating system of FIG. 3, the other end of the oil return pipe P50 is connected to the pipe P4 connecting the evaporator 5 and the compressor 1. With this structure, the lubricating oil collected in the tank 2a flows through the pipe P4 to be guided to the inlet portion of the compressor 1.

Figure 4:
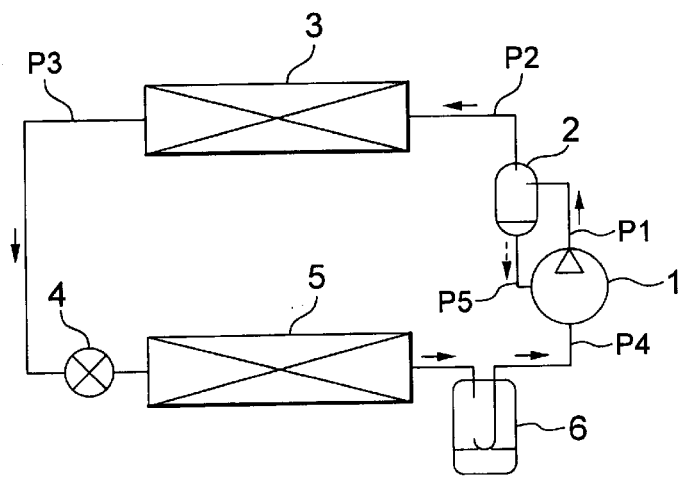
FIG. 4 is a circuit diagram of a refrigerating system according to a third embodiment of the present invention.

Referring to FIG. 4, the description will be made as regards a refrigerating system according to a third embodiment of the present invention. The refrigerating system to similar in structure to the refrigerating system of FIG. 1 except that the refrigerating system further comprises a vapor-liquid separator 6 known in the art. The vapor-liquid separator 6 is located in the middle of the pipe P4 connecting the evaporator 5 and the compressor 1 and has an oil returning structure.

Figure 5:
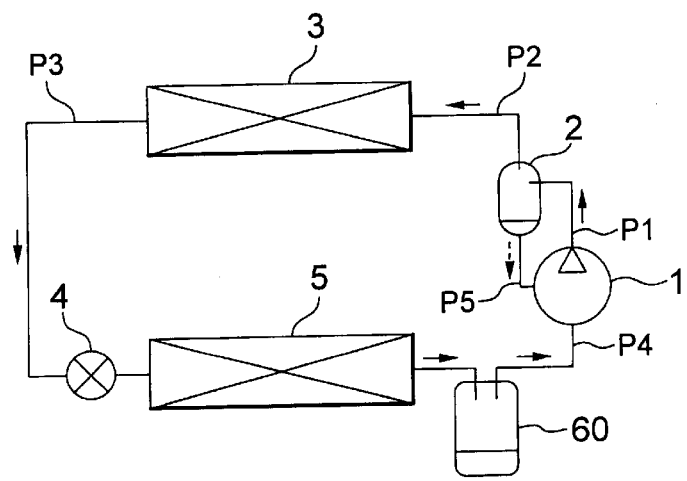
FIG. 5 is a circuit diagram of a refrigerating system according to a fourth embodiment of the present invention.

Referring to FIG. 5, the description will be made as regards a refrigerating system according to a fourth embodiment of the present invention. The refrigerating system is similar in structure to the refrigerating system of FIG. 4 except that the vapor-liquid separator 6 is replaced by a vapor-liquid separator 60. The vapor-liquid separator 60 located in the middle of the pipe P4 has no oil returning structure. The refrigerating system of FIG. 5 is suitable in case where the oil separator 2 performs sufficient oil separation.

In the foregoing embodiments, description has been directed to the case where carbon dioxide ($CO_2$) is used as the refrigerant confined in the refrigerating circuit. However, this invention is not restricted thereto. As far as the specific volume is small and the critical temperature is low, any desired substance can be used in place of carbon dioxide. For example, use may be made of a fluid such as ethylene ($C_2H_4$), diborane ($B_2H_6$), ethane ($C_2H_6$), or nitrogen oxide ($N_2O$).

The refrigerating system of this invention can be used not only in various air conditioners for a house, a building, and an automobile but also in an automatic dispensing machine for vending a cold article and in a refrigerating showcase.

As described above, according to the present invention, carbon dioxide smaller in specific volume than the halogenated refrigerant is used as the confined refrigerant of the refrigerating circuit. The discharge pressure of the compressor is selected to be equal to or higher than the critical pressure. The oil separator is disposed between the compressor and the radiator to separate carbon dioxide and the lubricating oil. Therefore, it is possible to reduce the amount of the lubricating oil flowing downstream from the oil separator to a refrigerant pipeline leading to the radiator, the expander, the evaporator, and the compressor. It is therefore possible to suppress sticking of the lubricating oil onto an inner peripheral surface of the refrigerant pipeline at the above-mentioned part. Thus, it is possible to minimize the pressure loss caused by sticking of the lubricating oil onto the inner peripheral surface of the refrigerant pipeline. Accordingly, as compared with the case where the halogenated refrigerant is confined, the inner diameter of the refrigerant circuit of the refrigerating system can be reduced. As a consequence, it is possible to achieve reduction in size of the refrigerating system so as to reduce the weight of the refrigerating system and to save the installation space.

What is claimed is:

1. A refrigerating system using a given refrigerant and comprising:
   a compressor for compressing said given refrigerant into a superaritical state having pressure higher than critical pressure of said given refrigerant, said compressor containing lubricating oil which is dissolved in said given refrigerant, and discharging a compressed refrigerant of the supercritical state and said lubricating oil;
   an oil separator connected to said compressor and supplied with said compressed refrigerant for separating said lubricating oil from said compressed refrigerant to produce an oil-separated refrigerant;
   a radiator connected to said oil separator for cooling said oil-separated refrigerant into a cooled refrigerant;
   expanding means connected to said radiator for decompressing said cooled refrigerant into a decompressed refrigerant having a pressure lower than said critical pressure; and
   an evaporator connected to said expanding means and said compressor for evaporating said decompressed refrigerant into an evaporated refrigerant which is supplied as said given refrigerant to said compressor.

2. A refrigerating system as claimed in claim 1, further comprising an oil return pipe connected between said oil separator and said compressor for returning said lubricating oil from said oil separator to said compressor.

3. A refrigerating system as claimed in claim 1, further comprising:
   a suction pipe interposed between said evaporator and said compressor for conducting said evaporated refrigerant from said evaporator to said compressor; and
   an oil return pipe connected between said oil separator and said suction pipe for supplying said lubricating oil from said oil separator to said suction pipe, said lubricating oil returning to said compressor together with said evaporated refrigerant.

4. A refrigerating system as claimed in claim 1, wherein said oil separator is assembled apart from said compressor.

5. A refrigerating system as claimed in claim 1, wherein said given refrigerant is carbon dioxide.

6. A refrigerating system as claimed in claim 1, wherein said oil separator has an inlet portion connected to said compressor for introducing said compressed refrigerant therein, said inlet portion being provided with a throttle.

7. A refrigerating system as claimed in claim 1, wherein said oil separator comprises:
   a tank; and
   an oil separating member placed in said tank for separating said compressed refrigerant into said lubricating oil and said oil-separated refrigerant;
   said tank having:
       an inlet hole connected to said compressor for conducting said compressed refrigerant from said compressor to said tank;
       an outlet hole connected to said radiator for conducting said oil-separated refrigerant from said tank to said radiator; and
       an return hole connected to said compressor for returning said lubricating oil from said tank to said compressor.

8. A refrigerating system as claimed in claim 7, wherein said tank comprises:
   a cylindrical portion having an upper open end and a lower open end;
   an upper cap fixed to said cylindrical portion to close said upper open end;
   a lower cap fixed to said cylindrical portion to close said lower open end.

9. A refrigerating system as claimed in claim 8, wherein each of said upper and said lower caps has a semispherical shape.

10. A refrigerating system as claimed in claim 1, wherein said given refrigerant has a specific volume which is smaller than that of a fluorocarbon refrigerant.

* * * * *

UNITED STATES PATENT AND TRADEMARK OFFICE
CERTIFICATE OF CORRECTION

PATENT NO.     : 6,185,955 B1
DATED          : February 13, 2001
INVENTOR(S)    : Kiyokazu Yamamoto It is certified that error appears in the above-identified patent and that said Letters Patent is hereby corrected as shown below:

Claim 1, column 7,
Line 49, delete "superaritical" and insert -- supercritical --.

Signed and Sealed this

Thirtieth Day of October, 2001

Attest:

NICHOLAS P. GODICI
Attesting Officer    Acting Director of the United States Patent and Trademark Office